United States Patent Office 3,114,759
Patented Dec. 17, 1963

3,114,759
HIGH TEMPERATURE FLUIDS
Richard N. Lewis, Mount Carmel, Conn., assignor to General Electric Company, a corporation of New York
No Drawing. Filed Nov. 25, 1960, Ser. No. 71,429
5 Claims. (Cl. 260—448.2)

The present invention relates to novel organosilicon compositions, particularly to thermally stable fluid materials and to a method for making them. More particularly, the present invention relates to novel aryloxyaryl substituted triorganohalosilanes, to the disoloxanes and aryloxyaryl substituted triorgano chain-stopped organopolysiloxy fluids derived therefrom, and to the method of making such materials.

The novel aryloxyaryl substituted triorganohalosilanes of the present invention have the formula:

(1) $\quad\quad (R-O-R')(R'')_a(R''')_b-SiX$ where R is a member selected from the class of a phenyl radical, halogenated phenyl radicals, aliphatic hydrocarbon substituted phenyl radicals and halogenated aliphatic hydrocarbon substituted phenyl radicals, R' is a divalent radical selected from the class of phenylene radicals, halogenated phenylene radicals, aliphatic hydrocarbon substituted phenylene radicals and halogenated aliphatic hydrocarbon substituted phenylene radicals, R'' is a member selected from the class of monovalent aryl radicals, monovalent alkaryl radicals, and halogenated monovalent derivatives thereof, R''' is a member selected from the class of monovalent aliphatic hydrocarbon radicals having up to four carbon atoms, and halogenated monovalent aliphatic hydrocarbon radicals having up to four carbon atoms, X is halo, $a$ is a whole number equal to from 0 to 1, inclusive, $b$ is an integer equal to from 1 to 2, inclusive, and the sum of $a$ and $b$ is equal to 2.

Included within the radicals represented by R of Formula 1 are phenyl, xylyl, chloroxylyl, tolyl, chlorophenyl, etc. radicals. Radicals represented by R' are phenylene, xylylene, chloroxylylene, tolylene, chlorophenylene, etc. radicals. Radicals represented by R'' include naphthyl, chloronaphthyl, xylyl, tolyl, phenyl, chlorophenyl, etc. Radicals represented by R''' include alkyl, and alkenyl, alkynl radicals having up to four carbon atoms, and halogenated derivatives thereof such as methyl, ethyl, propyl, butyl, vinyl, propenyl, chloropropyl, etc. R, and R'' can be all the same radical or a mixture of two of any of the aforementioned radicals. R and R' are preferably phenyl and phenylene, respectively, R'' is preferably phenyl or chlorophenyl, and R''' is preferably methyl.

The novel aryloxyaryl substituted triorganohalosilanes of Formula 1 can be derived from the starting halogenated aryl ether (2) $\quad\quad\quad\quad ROR'X$ and diorganodihalosilane (3) $\quad\quad\quad (R'')_a(R''')_b-SiX_2$ in accordance with procedures hereinafter described, where R, R', R'', R''' and X are as shown above.

Within the scope of the halogenated aryl ethers of Formula 2 there is included p-bromophenylphenyl ether, p-chlorophenylphenyl ether, p-bromophenyl-2,5-dimethylphenyl ether, 3-methyl-4-bromophenylphenyl ether, etc. Representative of the silanes included in Formula 3 are dimethyldichlorosilane, methylphenyldichlorosilane, methylvinyldichlorosilane, methylethyldichlorosilane, etc.

The novel aryloxyaryl substituted triorganohalosilanes of Formula 1 can be hydroylzed in the presence of base to produce the novel thermally stable aryloxyaryl disiloxanes of the present invention:

(4) $\quad\quad [R-O-R'-Si(R'')_a(R''')_b]_2O$ where R, R', R'' and R''', $a$ and $b$ are as defined above. These disiloxanes are thermally stable, high boiling fluids which have low or moderate viscosities and fairly low pour points. These fluids can be employed as a heat transfer medium at temperatures ranging from below 0° F. to above 700° F. These disiloxanes can also be employed as high temperature lubricants, damping fluids, and hydraulic fluids.

Also included among the novel organosilicon compositions of the present invention are aryloxyaryl substituted triorganosiloxy chain-stopped high temperature fluid organopolysiloxanes having the formula:

(5)

$$(R-O-R')(R'')_a(R''')_b-SiO\left(\begin{array}{c}Z\\|\\SiO\\|\\Z\end{array}\right)_y Si-(R''')_a(R'')_b(R'-O-R)$$

where R, R', R'', R''', and $b$ are as defined above, $y$ is an integer equal to from 1 to 18 inclusive, and Z is a member selected from the class of monovalent hydrocarbon radicals and halogenated monovalent hydrocarbon radicals, at least 60 mol percent of the silicon-bonded organic groups in the organopolysiloxane of Formula 5 being monovalent aliphatic hydrocarbon radicals having up to four carbon atoms.

Included within the definition of Z in Formula 5 are radicals such as aryl radicals and halogenated aryl radicals, including phenyl, tolyl, xylyl, chlorophenyl, etc; alkaryl radicals such as benzyl, phenylethyl, chlorobenzyl, etc.; aliphatic and cycloaliphatic such as alkyl, alkenyl, cycloalkyl, including methyl, ethyl, propyl, vinyl, cyclohexyl, etc.; preferably Z is methyl.

The novel organosilicon compounds of Formula 5 can be prepared in accordance with conventional procedures known to the art such as by cohydrolyzing an aryloxyaryl substituted triorganohalosilane of Formula 1 with an organohalosilane having the formula:

(6) $\quad\quad\quad\quad (Z)_2SiX_2$ or by equilibrating an aryloxyaryl disiloxane of Formula 4 with a cyclopolysiloxane having the formula:

(7) $\quad\quad\quad\quad \{(Z)_2SiO\}_n$ where X and Z are as defined above and $n$ is an integer equal to from 3 to 10, inclusive.

The reaction between the halogenated aryl ether of Formula 2 and the diorganodihalosilane of Formula 3 to produce the aryloxyaryl substituted organohalosilane of Formula 1 can be effected in accordance with conventional procedures such as by the use of a Grignard or an organolithium derivative of the halogenated aryl ether. Temperatures in the range of 0 to 100° C. are operable, while the reaction is preferably conducted under reflux, and the preferred temperature will therefore largely depend on the nature of the solvents utilized in the reaction. Suitable solvents include tetrahydrofuran, ethyl ether, dibutyl ether, etc. or mixtures thereof.

Conventional hydrolysis procedures preferably under alkaline conditions, i.e. pH of above 7 to as high as 14, are utilized in forming the aryloxyaryl substituted disiloxanes of Formula 4 from the starting aryloxyaryl substituted organohalosilanes. Temperatures in the range of 0° C. to 100° C. can be employed. Materials such as sodium hydroxide, sodium carbonate, ammonia, etc. can be utilized as neutralizing agents and to maintain alkaline conditions during the hydrolysis.

Recovery of the final product from the hydrolysis mixture can be accomplished in accordance with procedures well known to the art.

In order that those skilled in the art will be better able to practice the present invention, the following examples are given by way of illustration and not by way of limitation. All parts are by weight.

EXAMPLE 1

A mixture of 125 parts of magnesium metal, 100 parts of tetrahydrofuran, and 50 parts of dimethyldichlorosilane was placed into a vessel and the mixture was agitated and heated to reflux. There was then slowly added to the mixture under reflux, 1,000 parts of parabromophenylphenyl ether, 1700 parts of dimethyldichlorosilane, 100 parts of tetrahydrofuran and 225 parts of ethyl ether. When the addition was complete, the resulting mixture was refluxed for a total of about 12 hours, and allowed to stand thereafter for a period of 48 hours. The resulting mixture was then filtered and stripped under vacuum to a pot temperature of about 100° C. After refiltering the mixture, the crude filtrate was fractionated. The final product was found to have a boiling point of 161° C. at 5 mm. to 177° C. at 6 mm. The yield of product was 66%. Based on infrared data and method of preparation the compound was p-phenoxyphenyldimethylchlorosilane.

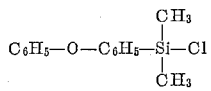

EXAMPLE 2

There was slowly added to a solution of 60 parts of sodium carbonate in 400 parts of water, 135 parts of the p-phenoxyphenyldimethylchlorosilane prepared in Example 1, while the resulting mixture was agitated. After the addition had been completed, the mixture was heated with stirring to 60° C. The aqueous layer was separated from the mixture and the residue was dried with sodium carbonate and filtered. The resulting product was then heated to a temperature of 260° C. to effect condensation. There was recovered 92 parts of 1,3-bis(p-phenoxyphenyldimethyl)-disiloxane having the formula:

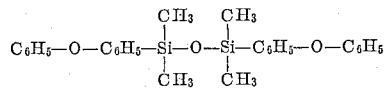

This product had a viscosity of 36 centistokes at 37.5° C., a boiling point of 290 to 292° C. (8 mm.), and a refractive index of $n_D^{23°}$ 1.5692. Analysis of the product showed, C=70.85, H=6.54 and Si=12.04 which agreed with the theoretical values of C=71.45, H=6.45 and SI=11.94. The identity of the product was confirmed by infrared analysis.

EXAMPLE 3

A mixture was prepared consisting of 47 parts of the above 1,3-bis(phenoxyphenyldimethyl)-disiloxane, 48 parts of octamethylcyclotetrasiloxane and 0.2 part of potassium hydroxide. The mixture was equilibrated by stirring for ½ hour at 180° C. After neutralizing the excess potassium hydroxide with acetic acid, the neutral oil was recovered and stripped of volatiles. There was recovered 33 parts of final product at a temperature of 390° C. that had a viscosity of 30 centistokes at 100° F. Based on method of preparation, reactant proportions and infrared data, the average formula of the fluid was:

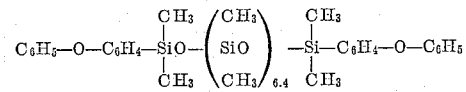

EXAMPLE 4

A mixture of 120 parts of the Grignard of parabromophenylphenyl ether and 200 parts of methylphenyldichlorosilane was refluxed for 8 hours in a reaction vessel while the mixture was stirred. The mixture was filtered and the filtrate was stripped to 165° C. at 20 mm. Distillation of the filtered residue at 175–260° C. at 2 mm. gave 104 parts of crude product. There was recovered 67 parts of final product as a result of fractionating the crude product at 198–219° C. at 2 mm. Based on infrared spectra and method of preparation the final product was methylphenyl-p-phenoxyphenylchlorosilane having the formula:

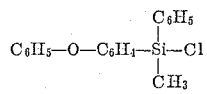

EXAMPLE 5

There was added to a vessel 67 parts of the p-phenoxyphenylmethylphenylchlorosilane of Example 4, 11 parts of sodium hydroxide, 300 parts of water and 60 parts of toluene. The mixture was heated and stirred for about ten minutes thereafter. The hydrolyzate was recovered and treated initially with acetic acid followed by sodium bicarbonate. The product was then filtered and distilled at 2.5 mm. over a temperature in the range of 300–365° C. There was obtained 27.5 parts of final product which boiled in the range of 335–350° C. and had a refractive index of $n_D^{30}$ 1.6499. Based on infrared data and method of preparation the final product was 1,3-bis(p-phenoxyphenylmethylphenyl)disiloxane having the formula:

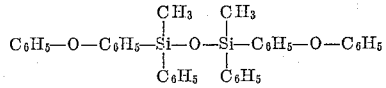

This formula was confirmed by elemental analysis which showed C=75.94, H=5.74 and Si=10.12 as compared to the theoretical values of C=76.73, H=5.76 and silicon =9.45.

In the table below, the thermal stability and low temperature fluidity of the 1,3-bis-(phenoxyphenyldimethyl)-disiloxane of Example 2, referred to as "Phenoxyphenyl" is compared to other aryldisiloxanes of comparable molecular weight, namely 1,3-bis-(biphenyldimethyl)-disiloxane or "Biphenyl" and 1,3-bis-(methyldiphenyl)-disiloxane or "Methyldiphenyl." The thermal stability of the various disiloxanes are determined by measuring the respective vapor pressures with an isoteniscope at temperatures above above 700° F. The low temperature fluidity of the various disiloxanes is determined by observing their physical properties at temperatures in the range of 0° F. The table below shows the results of the tests, where the term "satisfactory" under the heading "Thermal Stability" indicates that the disiloxane would perform adequately as a heat transfer medium at temperatures exceeding 700° F., while "Satisfactory" under "Fluidity" indicates that the disiloxane observed is fluid at temperatures below 0° F.

*Table*

| Disiloxanes | Thermal Stability (>700° F.) | Fluidity (<0° F.) |
| --- | --- | --- |
| Phenoxyphenyl | Satisfactory | Satisfactory (Liquid below −10 F.) |
| Biphenyl | do | Unsatisfactory (Solid at +68 F.) |
| Methyldiphenyl | do | Do. |

The above results show the unexpected utility of the aroxyaryldisiloxanes of the present invention as compared with disiloxanes of comparable molecular weight and configuration with respect to low temperature fluidity. As a result of the property of low temperature fluidity, in addition to thermal stability at elevated temperatures, the aroxyaryldisiloxanes can provide damping action, and be employed as a heat exchange medium over an unusually wide temperature range.

While the foregoing examples have of necessity been limited to only a few of the very many variables within the scope of the present invention, it should be understood that the present invention covers a broad class of aryloxyaryl substituted organosilicon compositions illustrated by Formulae 1, 4 and 5. All of these materials are prepared by methods specifically illustrated in the examples above and described further in the foregoing description of the present invention.

The examples have of necessity been directed to only a few of the very many process variables which are practicable in the process of the present invention. It should be understood, however, that the process of the present invention is illustrated by both the specific examples given as well as by the detailed description of the present invention which preceded these examples.

What I claim as new and desire to secure by Letters Patent of the United States is:

1. Fluid organopolysiloxanes having the formula:

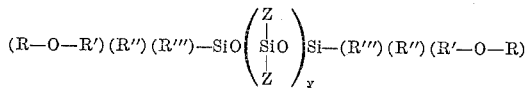

where R is a member selected from the class consisting of a phenyl radical, halogenated phenyl radicals, aliphatic hydrocarbon substituted phenyl radicals and halogenated aliphatic hydrocarbon substituted phenyl radicals, R' is a member selected from the class consisting of phenylene radicals, halogenated phenylene radicals, aliphatic hydrocarbon substituted phenylene radicals and halogenated aliphatic substituted phenylene radicals, R'' is a member selected from the class consisting of monovalent aryl radicals, monovalent alkaryl radicals, and halogenated monovalent derivatives thereof, R''' is a member selected from the class consisting of monovalent aliphatic hydrocarbon radicals having up to four carbon atoms, and halogenated monovalent aliphatic hydrocarbon radicals having up to four carbon atoms, Z is a member selected from the class consisting of monovalent hydrocarbon radicals and halogenated monovalent hydrocarbon radicals, and $y$ is an integer equal to from 1 to 18, inclusive, said fluid organopolysiloxane having at least 60 mol percent of monovalent aliphatic radicals having up to four carbon atoms based on the total number of organo radicals attached to silicon through carbon-silicon linkages.

2. Fluid disiloxanes having the formula:

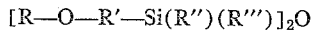

where R is a member selected from the class consisting of a phenyl radical, halogenated phenyl radicals, aliphatic hydrocarbon substituted phenyl radicals and halogenated aliphatic hydrocarbon substituted phenyl radicals, R' is a member selected from the class consisting of phenylene radicals, halogenated phenylene radicals, aliphatic hydrocarbon substituted phenylene radicals and halogenated aliphatic hydrocarbon substituted phenylene radicals, R'' is a member selected from the class consisting of monovalent aryl radicals, monovalent alkaryl radicals, and halogenated monovalent derivatives thereof, and R''' is a member selected from the class consisting of monovalent aliphatic radicals having up to four carbon atoms and halogenated monovalent aliphatic radicals having up to four carbon atoms.

3. 1,3-bis-(p-phenoxyphenylmethylphenyl)disiloxane.

4. Organohalosilanes having the formula:

where R is a member selected from the class consisting of a phenyl radical, halogenated phenyl radicals, aliphatic hydrocarbon substituted phenyl radicals and halogenated aliphatic hydrocarbon substituted phenyl radicals, R' is a member selected from the class consisting of phenylene radicals, halogenated phenylene radicals, aliphatic hydrocarbon substituted phenylene radicals and halogenated aliphatic hydrocarbon substituted phenylene radicals, R'' is a member selected from the class consisting of monovalent aryl radicals, monovalent alkaryl radicals and halogenated monovalent derivatives thereof, R''' is a member selected from the class of monovalent aliphatic hydrocarbon radicals having up to four carbon atoms and halogenated monovalent aliphatic hydrocarbon radicals having up to four carbon atoms and X is halo.

5. p-Phenoxyphenylmethylphenylchlorosilane.

References Cited in the file of this patent

UNITED STATES PATENTS

| | | |
|---|---|---|
| 2,846,458 | Haluska | Aug. 5, 1958 |
| 2,891,981 | Gainer et al. | June 23, 1959 |
| 2,985,677 | Gainer | May 23, 1961 |

FOREIGN PATENTS

| | | |
|---|---|---|
| 706,703 | Great Britain | Apr. 7, 1954 |

OTHER REFERENCES

McGregor: "Silicones and Their Uses," McGraw-Hill Book Co., Inc., N.Y., publishers, 1954, pages 267–268.

Chugunov: "Izvestia Akad. Nauk. SSSR," Otdel, Khim. Nauk, July 1959, pages 1341–1343.